No. 719,863. PATENTED FEB. 3, 1903.
S. D. POOLE.
DISK LISTED CULTIVATOR.
APPLICATION FILED JAN. 2, 1902.

NO MODEL.

UNITED STATES PATENT OFFICE.

STALEY D. POOLE, OF MOLINE, ILLINOIS, ASSIGNOR TO DEERE & COMPANY, OF MOLINE, ILLINOIS, A CORPORATION OF ILLINOIS.

DISK LISTED CULTIVATOR.

SPECIFICATION forming part of Letters Patent No. 719,863, dated February 3, 1903.

Application filed January 2, 1902. Serial No. 88,120. (No model.)

*To all whom it may concern:*

Be it known that I, STALEY D. POOLE, a citizen of the United States, residing at Moline, in the county of Rock Island and State of Illinois, have invented a certain new and useful Improvement in Disk Listed Cultivators; and I do hereby declare the following to be a full, clear, and exact description of the invention, such as will enable others skilled in the art to which it appertains to make and use the same.

This invention relates to disk listed cultivators of that type in which the disks are arranged in pairs, one pair behind another; and the object is to provide an efficient implement of this character with improved means whereby both pairs of disks may be raised and lowered simultaneously and instantly adjusted to any desired height.

With the old construction of single-row or double-row listed corn cultivators of this character in which disks are employed in pairs arranged to work one in advance of another when it is desired to adjust the disks in a vertical plane it can be accomplished only with each disk singly by loosening the clamps and bolts and raising or lowering the disks to a point which is determined by a mere guess of the operator, and after setting the four disks usually employed on a single-row machine or the eight disks usually employed on a double-row machine the machine then has to go into the ground to be tried, and if the adjustment is wrong the same operation has to be resorted to again and again until the proper adjustment is effected. The setting of eight disks according to this old method would occupy on an average a half hour, during which time the machine had to be stopped. By my improvement all of the disks may be instantly raised or lowered and fixed in any desired position whether the machine is in motion or stationary.

The invention will first be hereinafter more particularly described with reference to the accompanying drawings, which form a part of this specification, and then pointed out in the claim at the end of the description.

Figure 1:
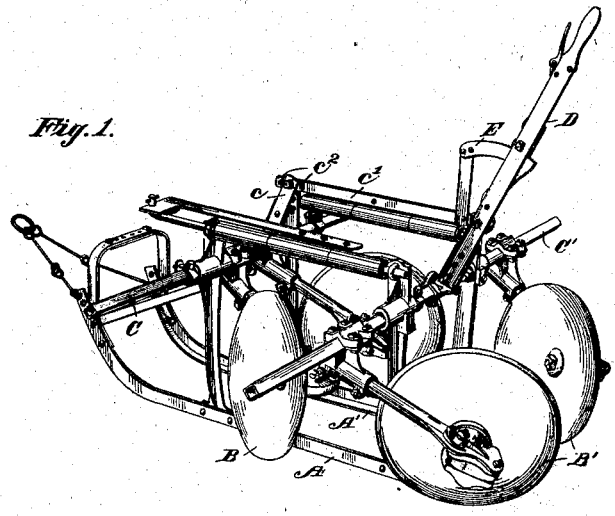
Figure 2:
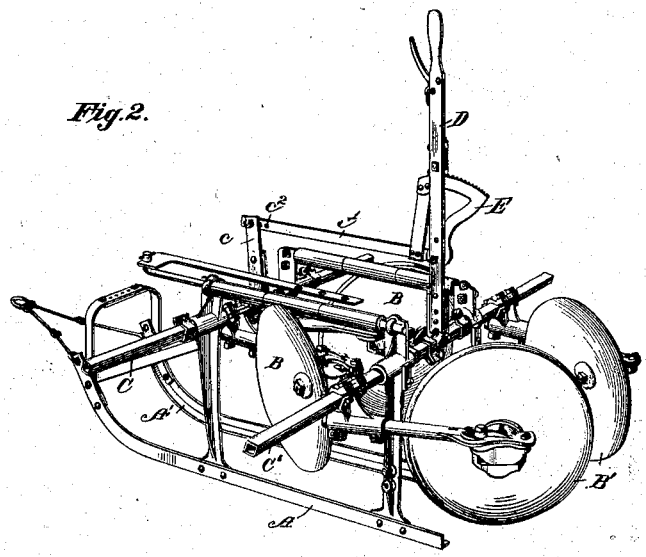

In said drawings, Figure 1 represents a perspective view of a disk listed single-row corn cultivator with my improvement applied thereto, the elevating mechanism being shown with the disks lowered; and Fig. 2 is a similar view of the same, showing the disks raised.

The machine shown consists, essentially, of a suitable frame mounted upon runners A, A', with provision for a driver's seat to be mounted thereon, together with a pair of revolving disks B at the front and another pair B' at the rear thereof, each suitably journaled in bearings carried by drag-bars extending rearwardly from brackets which are attached to transverse rock-shafts C and C', respectively, the first-named pair of disks having their convex surfaces facing or confronting each other, while the latter have their concave surfaces facing or confronting, and between the latter may be arranged any suitable fender, with means for sustaining the same in proper position relatively to the disks while allowing free vertical movement thereof, so that it may accommodate itself to the sinuosities of the ground over which it is caused to travel.

The rock-shafts C and C' may be journaled in any suitable boxes or bearings provided therefor and supported in any proper manner upon the machine-frame, being held against movement longitudinally by fixed collars or otherwise, as may be desired. On the shaft C is formed or rigidly secured an upright or arm $c$, which has its upper end pivoted to a connecting-bar $c'$, the other end of which is pivoted to an upstanding lever D, located beside a rack E, carried by the bar $c'$, said lever being provided with a spring-actuated locking-dog for engagement with said rack and a releasing device whereby the disks may be raised or lowered and locked at any desired elevation. By these means when the lever is moved forward the rock-shaft C' will be rotated in its sleeves or bearings, thereby raising the disks B', and the motion of said rock-shaft is communicated to the front rock-shaft C by means of the connecting rod or strap $c'$ and arm $c$. A reverse movement of the lever will lower the disks.

In order to change the relations of the forward pair of disks to the rear pair, the connecting rod or bar $c'$ is provided with a series of perforations $c^2$ to receive the fastening-bolt by which it is secured to the upstanding arm c, whereby the said fastening-bolt may be disconnected and inserted in any one of the apertures, thus lengthening or shortening the bar, and thereby changing the relative positions of the forward and rear pairs of disks.

It will be observed that the motion of the lever D instantly raises or lowers all four disks on the machine, and the notches in the rack-segment are preferably made so small that a very fine adjustment is obtained, which adjustment can be made while the machine is at work and without stopping the horses, if desired. A great advantage in this construction is to be found in the fact that the height of each disk is exactly the same as that of its opposing disk, whereas when adjusted singly and by hand, as heretofore, it is a mere matter of guesswork to attain the same height of a pair of disks, and when the disks are not of the same height the result is to guide the machine to one side or the other, and thus render the work very unsatisfactory.

While I have shown and described my improvements applied to a single-row listed corn cultivator, it will be understood, of course, that the invention is equally applicable to a double-row cultivator of the same class, two sets of levers being used in the latter case, one for each side of the machine.

Having thus fully described my invention, what I claim as new, and desire to secure by Letters Patent of the United States, is—

In a disk listed cultivator, the combination with a suitable supporting-frame, of a transverse rock-shaft mounted at the front and another rock-shaft in rear thereof, a pair of trailing bars adjustably and rigidly secured to each rock-shaft, and a pair of rotary cutting-disks carried by each pair of trailing bars, a lever rigidly mounted on one rock-shaft, a rigid arm on the other rock-shaft, a rod connecting said lever and arm, a rack mounted beside said lever, and a locking device on the lever engaging said rack, whereby both pairs of disks may be raised and lowered simultaneously and permanently held at any desired elevation.

In testimony whereof I affix my signature in presence of two witnesses.

STALEY D. POOLE.

Witnesses:
CHAS. H. POPE,
WM. BUTTERWORTH.